Feb. 20, 1968   H. T. COBEY   3,369,797
COMPOST TURNER AND WINDROW FORMING MACHINE
Filed June 8, 1966   3 Sheets-Sheet 1

INVENTOR.
HERBERT T. COBEY
BY
ATTORNEYS.

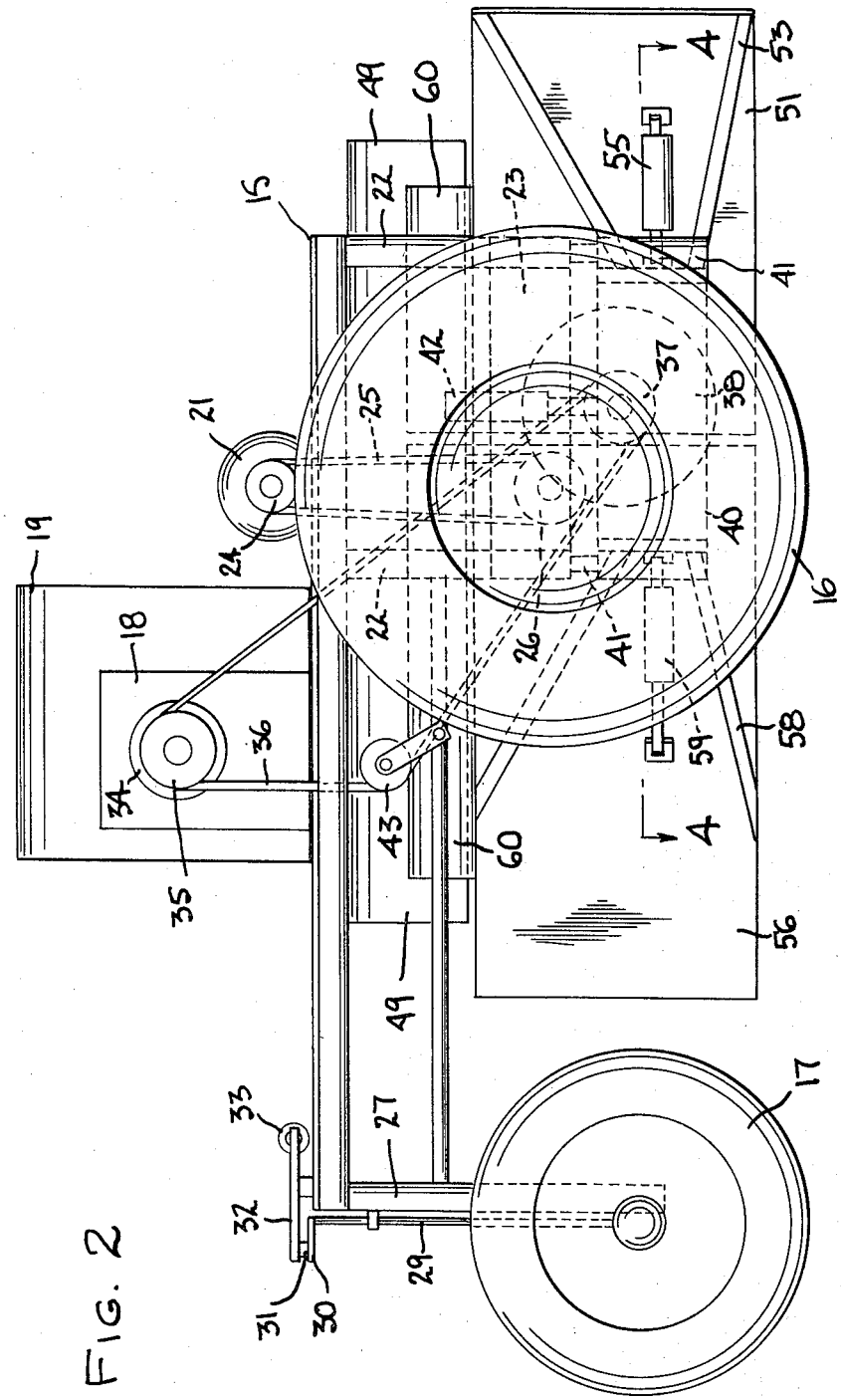

Feb. 20, 1968 H. T. COBEY 3,369,797
COMPOST TURNER AND WINDROW FORMING MACHINE
Filed June 8, 1966 3 Sheets-Sheet 3

INVENTOR.
HERBERT T. COBEY
BY *Isler & Ornstein*
ATTORNEYS.

3,369,797
COMPOST TURNER AND WINDROW
FORMING MACHINE
Herbert T. Cobey, P.O. Box 685,
Galion, Ohio 44833
Filed June 8, 1966, Ser. No. 556,152
11 Claims. (Cl. 259—28)

ABSTRACT OF THE DISCLOSURE

A mobile apparatus for straddling ground-deposited material, such as compost, and provided with a power-driven rotatable throwing member which engages and fragments the material and transfers it through a passageway in the apparatus so that it is discharged and redeposited in a desired windrow formation.

Disclosure

The present application relates generally to machines or apparatus for the commercial turning of compost piles combined with means for dispersing the turned compost into windrows of desired heighth and width.

The term "compost" is probably subject to a wide variety of definitions. For the purposes of this application, I intend to include and embrace within the term "compost" any variety of organic material, which may be animal or vegetable in origin, and which through decay and oxidation and bacterial action is modified or converted to a suitable nutrient for agricultural purposes, or to some other form for disposal or use. It will be understood that such organic matter, such as leaves, sawdust, straw, livestock manure, garbage and other waste products will decay or rot under moist and aerobic conditions to form humus which is the major constituent of usable compost. The fresh or undecayed organic materials which are utilized for the compost, contain plant nutrients which, such as in fresh manure, exist as insoluble compounds which must first be decomposed in order to make them available for plant growth.

The rotting or decomposition of the organic materials is accomplished on a commercial scale by the gathering and depositing of the compost materials in piles which are maintained suitably moist and are periodically turned to accelerate oxidation influences and bacterial decomposition. For the commercial production of compost, it is desirable that efficient means be utilized for the aeration of the compost and that the material be disposed in such a manner as to permit the effective utilization of available space as well as to permit ready access thereto by the compost turning and windrow forming apparatus which will be herein described.

It is a primary object of my invention to provide apparatus for the periodic turning of compost piles which is self-propelled and which has improved dispersal characteristics.

Another object of my invention is to provide apparatus of the character described which has means for depositing the turned compost in windrows for further processing.

Still another object of my invention is to provide apparatus of the character described which has adjustable means for establishing the heighth and width of the windrows to be formed.

Other objects and advantages of my invention will become apparent during the course of the following description.

In the drawings, in which like reference numerals designate like parts throughout the same, FIG. 1 is a view in front elevation of the apparatus embodying the features of my invention.

FIG. 2 is a view in side elevation of the apparatus shown in FIG. 1, as viewed from the left side thereof.

Figure 1:
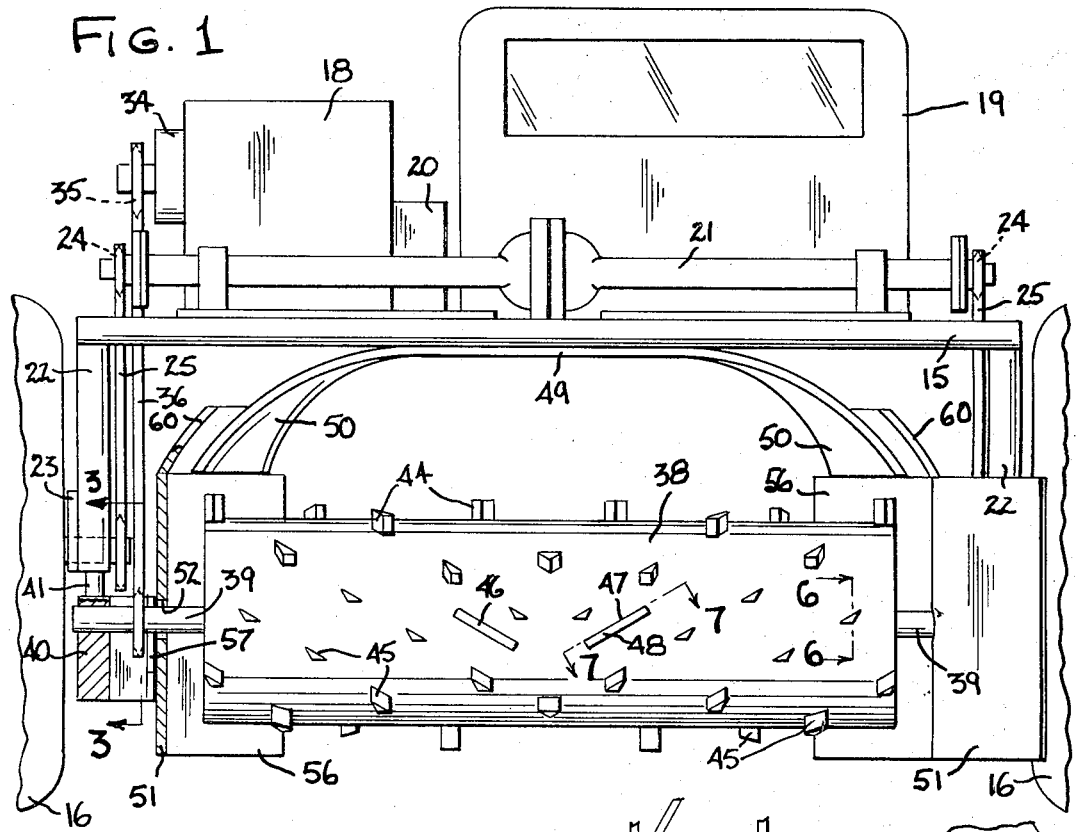
Figure 3:
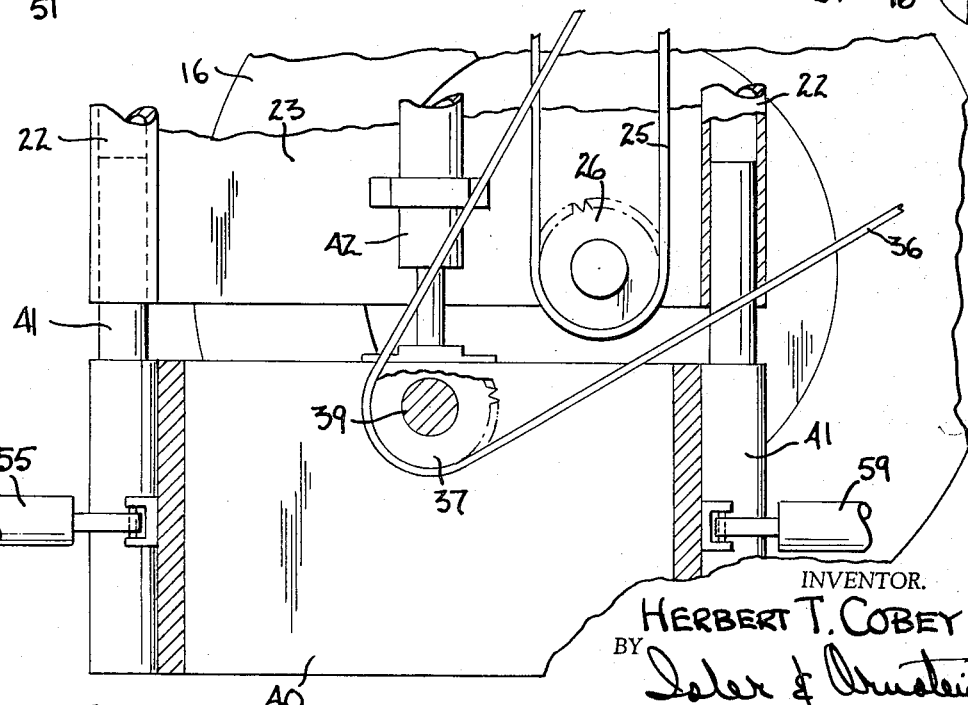
FIG. 3 is an enlarged fragmentary cross-sectional view taken as indicated on line 3—3 of FIG. 1 showing elements of the drive train and drum mounting assembly.
Figure 4:
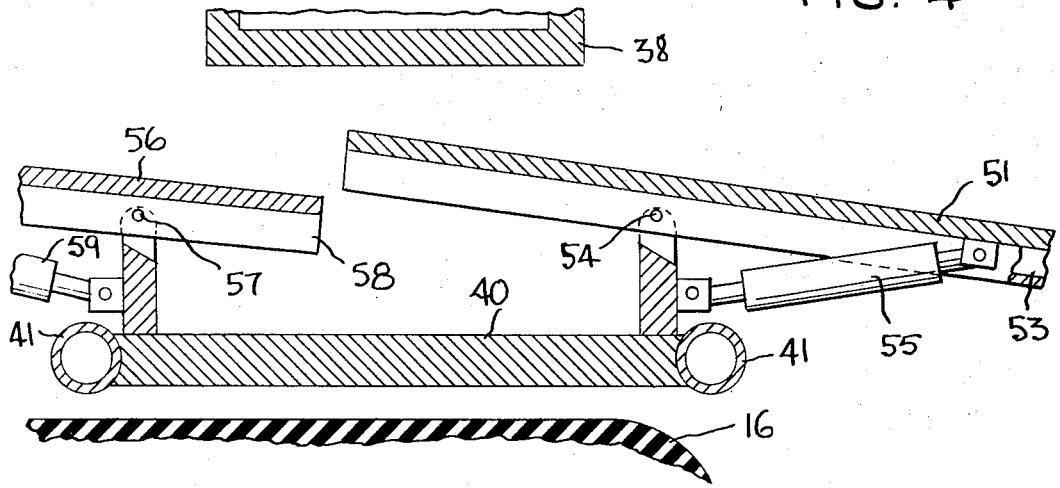
FIG. 4 is a fragmentary cross-sectional view taken as indicated on line 4—4 of FIG. 2 showing elements of the shield adjusting mechanism.
Figure 6:
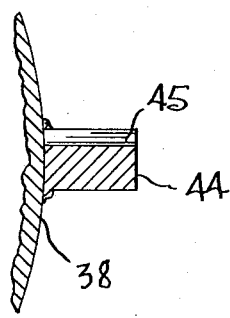
FIG. 6 is an enlarged fragmentary cross-sectional view taken as indicated on line 6—6 of FIG. 1 showing the form of tooth on the drum.
Figure 7:
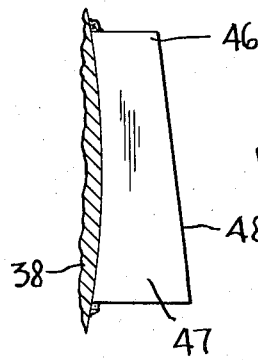
FIG. 7 is an enlarged fragmentary cross-sectional view taken as indicated on line 7—7 of FIG. 1 showing the form of blade on the drum.
Figure 5:
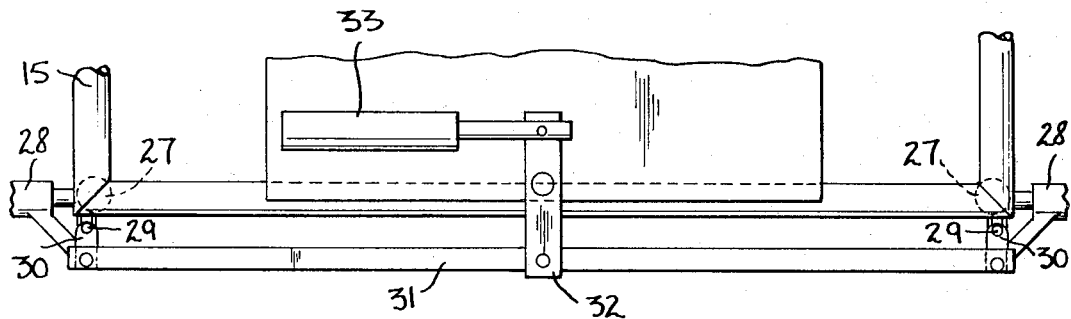
FIG. 5 is a fragmentary top plan view showing the rear of the apparatus and elements of the steering mechanism.

Referring more particularly to the drawings, I have illustrated a self-propelled compost turning and windrow forming machine or apparatus which includues a tubular frame 15, preferably formed as a weldment. The frame 15 is supported above ground level by any suitable transport means such as by a pair of front driving wheels 16 and a pair of rear steering wheels 17; both pairs of wheels being connected to the frame 15 by means which will be hereinafter described. It will be understood that other forms of transport means, such as endless tracks, could be utilized, and I include such other forms broadly within the term "wheeled" as used herein.

The horizontally extending portion of the frame 15 provides a support surface for an internal combustion engine or other power plant 18 and for an operator's cab 19, as well as for additional power transmission and control equipment which will be more fully described in due course.

The engine 18 is operatively coupled to a hydraulic pump and reservoir system, indicated diagrammatically at 20. The hydraulic system in turn is connected operatively to a power-transmitting axle assembly 21, which is mounted on top of and supported by the frame 15. The forward end of the frame 15 is provided on opposite sides thereof with a pair of depending tubular standards or posts 22, to the lower end of which is affixed a journal plate 23 in which the driving wheel 16 is secured for rotation.

Each end of the hydraulic transmission 21 is provided with a chain sprocket 24 which is connected by a drive chain 25 to a sprocket 26 on the wheel 16. By means of the hydraulically-powered transmission unit 21 with its broad and versatile speed range, the ground speed of the apparatus can be controlled from a creeping pace of approximately 10 feet per minute to a transport speed of approximately 300 feet per minute, or such other range of surface speeds as might be required or desired and for which the apparatus may be designed.

The rear end of the frame 15 is provided with depending standards or posts 27 to the lower end of which the rear steering wheels 17 are secured by means of a conventional steering knuckle 28 which permits the wheels to have pivotal steering movement relative to the frame 15. A vertically disposed rod 29 is rotatably secured to the frame 15 and is provided with upper and lower crank arms 30 at the opposite ends thereof. The lower crank arm of each rod 29 is connected by suitable linkage to the steering knuckle of one of the wheels 17. The upper crank arm of each of the rods 29 is pivotally secured to a tie rod 31 which interconnects the two upper crank arms 30. A pivoted lever arm 32 is mounted on the frame 15 and has one end thereof connected to the tie rod 31 approximately midway thereof. The other end of the arm 31 is connected to the transversely extending rod of a hydraulic cylinder 33 which is secured to the frame. By suitable control mechanism (not shown) the hydraulic cylinder 33 can be actuated to cause arcuate movement of the arm 32 in one direction or the other, which is translated into axially linear movement of the tie rod 31, which, in turn, acts upon the crank arms 30 of the steering linkage to cause steering movement of the wheels 17 as required.

The engine 18 is provided with a clutch-operated power takeoff 34 having a chain sprocket 35 provided thereon. A power-transmitting chain 36 connects the sprocket 35 with a larger sprocket 37 which is secured to one end of a cylindrical rotary drum 38. The drum 38 is positioned towards the forward end of the frame 15 and extends transversely thereof in a substantially horizontal plane. The ends of the drum 38 are journalled, as at 39, in a journal block 40 which is affixed to a pair of guide posts 41 which telescopically and slidably engage and are received by the tubular vertically extending posts 22. A double acting hydraulic cylinder 42 is anchored to a portion of the frame 15 and operatively engages the movable support assembly or journal block 40 to elevate it or lower it, as desired, by means of suitable hydraulic controls (not shown). A pivotally mounted, spring-loaded idler sprocket 43 is associated with the chain 36 to take up the slack in the chain which results from the variable positioning of the journal block 40. The speed of rotation of the drum 38 is controlled by the speed of the engine 18. However, this speed is substantially independent of the ground speed of the machine which, as heretofore described, is controlled hydraulically through the hydraulic transmission axle assembly 21. Therefore, the ground speed of the unit and the rotational speed of the drum 38 can be independently controlled by the operator.

The periphery of the drum 38 is provided with a plurality of radially projecting teeth 44 which have flat or slightly concave throwing surfaces 45 provided on one face thereof. The teeth 44 are positioned in a helical or spiral pattern in converging relationship from each end of the drum 38 toward its midpoint. The throwing surfaces 45 of the teeth are angularly inclined to the direction of travel of the periphery of the drum and in a converging relationship towards the midpoint of the drum. By means of this arrangement of the teeth 44, the compost is lifted by the teeth and directed angularly toward the center of the machine as the drum is rotated rapidly in a clockwise direction, as viewed from the right hand side of FIG. 1. The auger effect provided by the positional pattern of the teeth 44 outboard of the midpoint of the drum 38 and the inwardly directed throwing effect of the angular inclined throwing surfaces 45 on the teeth, in which the leading edge of the surface 45 is outboard of the trailing edge, can be augmented if desired by broad-surfaced blades 46, which do not project radially outwardly of the drum to as great a distance as the teeth 44, but which also have angularly inclined throwing or impact surfaces 47, the leading edges of which are outboard of the midpoint of the drum. The blades 46 are further provided with a radially projecting slicing edge 48 which is angularly inclined to the longitudinal axis of the drum 38 with the more remote or distal portion thereof being outboard of the midpoint of the drum.

The underside of the frame 15 above the drum 38 is protected by a metal shield 49 which is secured to the frame. The shield 49 is provided with downwardly extending side portions 50 which taper inwardly towards the rear of the machine to provide a type of funnel effect for the discharge of the compost which is thrown rearwardly and upwardly by the revolving drum 38.

The apparatus is also provided with a pair of spaced forwardly-extending wings or shields 51 which are disposed outboard of the ends of the drum 38 and of the sides 49 of the top shield 50. An opening 52 in each of the wings 51 permits the journal 39 of the drum 38 to traverse the wings. Each wing 51 is secured by suitable braces 53 to a pivotal connection 54 on the movable journal block 40. Means are provided for adjustably positioning the angularity of each of the wings 51, so that the throat or opening defined between the forward surfaces of the pair of wings 51 can be varied. Any suitably mechanical means may be utilized, but I have here shown such means in the form of a double-acting hydraulic cylinder 55 having one end thereof pivotally secured to a portion of the journal block 40 and having the other end thereof pivotally connected to a part of the wing 51. By extending or contracting the effective length of the hydraulic cylinder 55, its respective wing 51 is caused to pivot to increase or decrease its angularity relative to its companion wing 51 and thereby adjust the throat opening defined therebetween.

A pair of rearwardly extending wings 56 are similarly pivotally secured, as at 57, to the journal block 40 by means of braces 58, so that the discharge opening defined between the rearward faces or edges of the wings 56 can be varied. Each of the wings 56 can be adjustably positioned by suitable means, such as a double-acting hydraulic cylinder 59 having one end thereof pivotally secured to the journal block 40 and having the other end thereof pivotally connected to a portion of the wing 56.

The combination of the forward wings 51 and the forward portion of the top shield 49 provides and defines the feed throat of the apparatus. The combination of the rear shields 56 and the rearward portion of the top shield 49 provides and defines the discharge throat of the apparatus. The upper portion of each pair of wings 51 and 56 may be curved or bent inwardly, as at 60, so as to overlie and be complementary in some degree to the sides 50 of the top shield 49. This overlap blocks the gap that would otherwise exist in this area and thereby prevents or, at least, minimizes the discharge of compost upwardly through the gap.

The operation of the apparatus

In the commercial production of rotted manures or compost, the raw materials are collected from livestock farms or other producers and delivered, usually by truck, to a large plot of land or other open area, where the material is deposited. The raw material, for example raw manure, must be maintained in a compact, moist mass, which is turned periodically during a three or four week period so that the entire mass is uniformly decomposed.

In utilizing the apparatus which has heretofore been described, the operator brings the front end of the apparatus into close proximity to the back end of a dump truck which is delivering the raw compost material. The forward wings 51 have been lowered to their ground-engaging position, and the drum 38 is simultaneously lowered. When the wings 51 and 56 are in their ground-engaging position, the elevation of the drum 38 will be such that the teeth 44 will likewise engage or be proximate to ground level.

The width between the forward edges of the wings 51 is then adjusted by means of the hydraulic cylinder 55 so that the forward wings will straddle the dumping end of the delivery truck. As previously described, the wings 51 are positioned outboard of the ends of the drum 38, which may have a nominal diameter of approximately 3 feet and a length of approximately 10 feet. Thus, the spread or distance between the pair of wings 51 is substantial and may be adjusted from approximately 10 feet to approximately 14 feet. The wings 51 may project forwardly of the periphery of the drum 38 for a distance of approximately 5 or 6 feet, and the rear wings 56 may project rearwardly of the periphery of the drum a like distance. The top shield 49 may lie approximately 6 feet above ground level.

With the apparatus in position behind the delivery truck, the dump body is elevated to discharge position and the truck moves forward slowly as the apparatus follows close behind. The dumped raw material is deposited in the feed throat of the apparatus and is engaged by the rapidly revolving drum 38 as the apparatus slowly moves forwardly. The slicing and impact and throwing edges and surfaces on the drum break up and fragmentize the mass of deposited compost material and throw it upwardly and rearwardly through the tapered discharge throat of the apparatus. The previously described left hand and right hand auger pattern of location of the teeth 44 supplements the directional inclination of the throwing surfaces 45 to direct the fragmented material towards the central axis or midpoint of the apparatus.

The fragmented material exits from the apparatus through the tapered discharge throat and is deposited as a continuous windrow, the width of which can be substantially predetermined by the spacing between the trailing portions of the rear wings 56 which can be adjusted and selected by operation of the hydraulic cylinder 59. The heighth of the windrow is determined by the speed of surface travel of the apparatus and cannot, of course, be of greater heighth than the straddle heighth of the apparatus as determined by the elevation or level of the top shield 49.

This method of operation is continued as successive truck deliveries of the raw compost material are made. The mass of delivered material is thereby fragmented and deposited in a uniform windrow of a continuous length which can be commensurate with the available space or area. If the ground area should be very uneven or if it is plentifully sprinkled with protruding rocks or boulders which might be injurious to the teeth 44 of the drum, then the hydraulic cylinder 42 can be actuated to elevate the drum 38 and contemporaneously therewith the wings 51 and 56 to a selected distance above the ground surface, so as to avoid hinderance and injury to the apparatus. The drum and wings would also be elevated to a non-operating position when it is merely desirable to move the apparatus from one location to another, without utilizing its compost turning and windrow forming function.

After the raw compost mass has been fragmentized and deposited in windrows as described above, it is necessary that the compost be turned periodically, for example once or twice a week, during the time that it takes for the mass to fully decompose. In order to maintain compactness of the mass which is conducive to bacterial action and rapid decomposition, it is desirable that the windrows be made compact as the decomposition progresses.

For the purpose of obtaining the subsequent turning of the mass and the subsequent windrow formation after the initial deposit of the material, the apparatus is placed in position at the terminal end of a windrow so as to straddle it. The desired spacing between the wings 51 and the wings 56 is selected by actuation of the hydraulic cylinders 55 and 59 respectively, with the objective of reducing the width of the deposited windrow and, if desired, also increasing its heighth. The operator causes the apparatus to move forwardly and follow the windrow with the rotating drum 38 again turning and fragmenting the compost material and discharging it in a more compact windrow formation behind the apparatus, as determined by the spacing of the adjustable rear wings 56, as well as by the rotative speed of the drum 38 and the ground speed of the apparatus. The speeds are selected by the operator of the apparatus based upon his judgment as to the empirical results obtained. This may vary with the consistency of the compost mass, its particular stage of decomposition, or climatic conditions. This same procedure is followed on all the other windrows of compost material which are being processed.

After the first turning of the windrow of compost material as above described, the process is subsequently repeated after an appropriate time interval, so that the compost is again turned and the width of the windrow is again decreased. In this manner, with periodic use of the apparatus on the windrows, the processing of the windrows of compost is completed and the raw materials have been decomposed to achieve a commercial form of humus or plant food.

By use of the apparatus above described, the mass of raw compost material is quickly and uniformly fragmentized during each turning operation and the size of the windrows can be controlled.

If desired, the apparatus may be provided with a tank or other form of suitable liquid storage system, by means of which liquid can be sprayed upon the windows during the operation of the apparatus. The liquid may be water, for adding moisture to aid in the natural composting of the organic material. Or such liquid might be a chemical composition, such as a deodorizing fluid, if such is desired.

It is to be understood that the form of my invention, herewith shown and described, is to be taken as a preferred example of the same, and that various changes may be made in the shape, size and arrangement of the parts thereof, without departing from the spirit of the invention or the scope of the subjoined claims.

Having thus described my invention, I claim:

1. A travelling compost-turning and windrow-forming apparatus having a straddle frame defining a ground-level enclosed longitudinally-extending passageway therethrough in its direction of travel, a projection-presenting compost-throwing member rotatably secured to said frame in association with said passageway for rotation about an axis transverse to said passageway, generally vertically-disposed retaining wings carried by said frame in transversely-spaced relationship to define the feed throat and discharge throat of said passageway, and power means operatively associated with said member for causing rotation thereof in a direction to transfer compost material from said feed throat through said passageway to said discharge throat, said passageway being convergent toward its discharge end to deposit said material in a continuous windrow formation.

2. A compost-turning apparatus as defined in claim 1, wherein said compost-throwing member is provided with a plurality of radially-projecting elements, said elements each having a compost-throwing surface provided thereon, said throwing surface being angularly inclined to the direction of rotation of said member, and said angular inclination of said surfaces of the elements on one portion of said member being opposite to the direction of angular inclination of said surfaces of the elements on another portion of said member, whereby to direct compost material inboard of the ends of said member in response to rotation thereof.

3. A compost-turning apparatus as defined in claim 2, wherein said compost-throwing member is in the form of a cylinder, and said elements are positioned on opposite sides of the median diametrical plane of said cylinder, the elements to one side of said plane being positioned in a helical pattern providing an auger configuration thereon, and the elements on the other side of said plane being positioned in a helical pattern providing an auger configuration thereon of opposite hand to said first-named auger configuration.

4. A compost-turning apparatus as defined in claim 1, wherein said compost-throwing member is provided with a plurality of radially-projecting elements positioned on opposite sides of the midpoint of said member, at least a portion of the elements on one side of said midpoint being positioned in a helical pattern to provide an auger configuration thereon, and at least a portion of the elements on the other side of said midpoint being positioned in a helical pattern to provide an auger configuration thereon of opposite hand to said first-named auger configuration, whereby to direct compost material inboard of the ends of said member in response to rotation thereof.

5. A compost-turning apparatus as defined in claim 1, including a pair of transversely-spaced support assemblies movably mounted on said frame for displacement in a substantially vertical plane, said compost-throwing member being supported by and journalled in said pair of support assemblies and movable therewith, and adjusting means carried by said frame and engaging said support assemblies for selectively moving and maintaining said support assemblies to a desired position of elevation relatively to said frame, whereby to simultaneously position said member.

6. A compost-turning apparatus as defined in claim 5, wherein said adjusting means comprises a double-acting hydraulic cylinder.

7. A compost-turning apparatus as defined in claim 5, wherein said retaining wings are secured to said pair of support assemblies for elevating or lowering movement therewith.

8. A compost-turning apparatus as defined in claim 7, wherein a forwardly-extending portion of each of a pair of retaining wings is pivotally secured to said support assembly for rotation in a substantially horizontal plane, a rearwardly-extending portion of each of a pair of retaining wings is pivotally secured to said support assembly for rotation in a substantially horizontal plane, and including means carried by said frame and engaging said wing portions to selectively rotate and maintain said respective wing portions in predetermined positions of angularity relatively to each other, whereby to enlarge or decrease said feed throat area or said discharge throat area.

9. A compost-turning apparatus as defined in claim 1, wherein a rearwardly-extending portion of each of a pair of retaining wings is pivotally secured to a portion of said frame for rotation in a substantially horizontal plane, and including adjusting means carried by said frame and engaging said pivotally-mounted portion for selectively rotating said portions to a predetermined position of angularity relatively to each other, whereby to enlarge or decrease said discharge throat area.

10. A compost-turning apparatus as defined in claim 1, wherein a forwardly-extending portion of each of a pair of retaining wings is pivotally secured to a portion of said frame for rotation in a substantially horizontal plane, and including adjusting means carried by said frame and engaging said pivotally-mounted portion for selectively rotating said portions to a predetermined position of angularity relatively to each other, whereby to enlarge or decrease said feed throat area.

11. A travelling compost-turning apparatus comprising, in combination, a straddle frame defining a longitudinally-extending passageway therethrough in its direction of travel, a compost-turning member rotatably secured on said frame and in said passageway for rotation about an axis transverse to said passageway, a pair of generally vertically-disposed retaining wings mounted on said frame in transversely spaced relationship and extending forwardly of said member in one direction to define the feed throat of said apparatus, and extending rearwardly of said member in the opposite direction to define the discharge throat of said apparatus, means in said passageway defining a roof portion therein over and above said member and between said feed throat and discharge throat, a plurality of generally radially-projecting elements secured to said compost-turning member, means including said roof portion and a compost-throwing surface formed on each of said elements in predetermined angular relationship to the direction of rotation of said member for controlling the discharge direction of compost material engaged thereby to form a windrow, and power means carried by said apparatus and operatively connected to said member for causing rotation thereof in a direction to transfer compost material from said feed throat through said passageway to said discharge throat.

References Cited
UNITED STATES PATENTS

| | | | |
|---|---|---|---|
| 587,444 | 8/1897 | Kraft | 259—126 |
| 2,159,509 | 5/1939 | Mosel | 94—39 |
| 2,169,987 | 8/1939 | Mosel | 94—39 |

ROBERT W. JENKINS, *Primary Examiner.*